United States Patent Office 3,682,688
Patented Aug. 8, 1972

3,682,688
METHOD OF FIXING A CHELATED ORGANIC TITANATE VEHICLE TO A SUBSTRATE
Charles Thomas Hughes, Naperville, Ill., and Duane Owen Paulsen, Wilmington, Del., assignors to E. I. du Pont de Nemours and Company, Wilmington, Del.
No Drawing. Filed June 17, 1970, Ser. No. 47,162
Int. Cl. C09d
U.S. Cl. 117—168   1 Claim

ABSTRACT OF THE DISCLOSURE

A stable vehicle for the transfer of pigment, dyes or coatings to a substrate can be prepared from polyactive hydrogen containing compounds having a molecular weight of at least 62 and resins having a molecular weight of from 600 to 10,000 and at least one —OH, —NH$_2$,

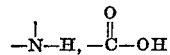

or enolizable keto group and a chelate ester of ortho titanic acid having the formula

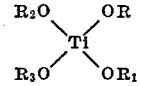

wherein R and R$_1$ are C$_2$–C$_{10}$ aliphatic hydrocarbyl groups substituted with at least one electron donor group chosen from —OH, —NH$_2$, substituted amino or $>$C=O and R$_2$ and R$_3$ may be the same as R and R$_1$ or may be chosen from —H and C$_2$–C$_8$ alkyl. The vehicle can be cured by subjecting it to temperatures in excess of 80° C. to produce a smudge-proof print.

BACKGROUND OF THE INVENTION

Commercial inks today are generally classified according to the manner in which they are to be used. All inks however have certain similarities of composition which are basic to their use. They all contain a pigment or dye of some sort which forms the more or less permanent mark on a substrate, be it paper, cloth, wood, metal, or other material. By far the most common pigment is carbon black, which has been used from the earliest known times in ink manufacture. Many mineral pigments are used, such as cadmium sulfate, lead chromate, and many more, and also organic pigments such as eosine, methyl violet, phthalocyanines and a host of others.

The second essential feature of an ink or coating composition is a vehicle, in which the pigment is transported to the printing device and from there to the substrate on which a deposit is to be left. The vehicle is usually a mixture of substances and may be thick or thin, compatible or not compatible with water, fast or slow drying, or possessing other properties necessary in the kind of printing for which the ink is to be used.

Most vehicles include a resinous material which dries to a hard film on the substrate. The pigment is fixed or embedded in the resin. The resinous materials commonly used may be of natural or synthetic origin. They must be sufficiently soluble in a solvent, or fluid enough to provide mobility to transport the pigment through the printing process.

U.S. Pat. 3,013,895 and U.S. Pat. 2,732,799 disclose rapid setting of printing ink containing conjugated double bonds and polyhydroxy compounds by use of aliphatic titanium ortho esters under cold energy in the presence of moisture. Chelated titanium ortho esters such as those disclosed in U.S. Pats. 2,643,262 and 2,824,114 are too stable to react under the above conditions and thus have proven unsatisfactory for the above processes.

SUMMARY OF THE INVENTION

Stable printing ink comprising a stable vehicle for transfer of pigments, dyes or coatings to a substrate comprising an organic source of active hydrogen selected from the group consisting of polyactive hydrogen containing compounds having a molecular weight of at least 62 and resins having a molecular weight of from 600 to 10,000 and at least one —OH, —NH$_2$,

or enolizable keto group and a chelate ester of ortho titanic acid having the formula

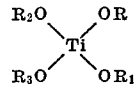

wherein R and R$_1$ are C$_2$–C$_{10}$ aliphatic hydrocarbyl groups substituted with at least one electron donor group chosen from —OH, —NH$_2$, substituted amino or $>$C=O and R$_2$ and R$_3$ may be the same as R and R$_1$ or may be chosen from —H and C$_2$–C$_8$ alkyl, and a pigment or dye is disclosed herein. The stable vehicle and stable ink disclosed can be cured by heating to a temperature in excess of 80° C.

DESCRIPTION OF THE INVENTION

The most general way of classifying inks is according to the three historic divisions of printing: typographic, where the characters or material to be transferred from the printing plate are raised from the plate surface; planographic, where the ink transfer is made from a plane surface; and intaglio, where the ink transfer is from engravings or depressions in the surface of the printing plate.

Within these three classes, of which typographic printing is easily the most important, many sub-classes exist, for each of which inks of certain properties are required.

The process of this invention, which is dependent for its function on chemical reaction involving the ink vehicle, is found useful in inks used in all three principal classes of printing. Where, as in newspaper printing, the drying depends mainly on absorption of the vehicle in the substrate, the effectiveness of the process is minimal. Its greatest effect is found where the vehicle is a major proportion of the ink formula, and the printed matter, because of the kind of handling it receives or any other reason, must dry quickly and not be subject to smearing.

Drying of inks can be regarded as occurring in two stages. The first stage, ink setting, implies that the ink has dried sufficiently to be handled without unacceptable rubbing off or shifting of the print. The second stage, ink hardening, refers to final drying where the ink has dried to a hard film and no longer changes in physical properties. There is no sharp line of demarcation between these two stages. High speed printing requires very rapid completion of the first stage, and is frequently aided by application of heat or radiant energy in some form.

Materials useful in the vehicles of the instant invention must contain active hydrogen groups, usually hydroxyl groups, but alternately —NH$_2$ or

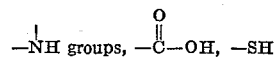

and possibly others. In resins of high molecular weight (>600), one active hydrogen containing group per molecule is usually sufficient to provide a hard film when two such molecules are cross-linked through the titanium of the titanate ester. For lower molecular weight materials at least 2 active hydrogen containing groups per molecule must be provided so that polymer formation can take place. Diethylene glycol and glycerine are examples of such materials. Among the resinous materials found useful are polyamide resins, cellulosic resins, maleic polyesters, fumaric polyesters, phthalic polyesters, phenolics, rosin, rosin dimers, rosin esters, rosin polyesters, acrylics, methacrylics, melamine formaldehydes and methylol derivatives. Glycerol and pentaerythritol esters of natural or synthetic acids are among the most widely used resins in inks of recent years. All of the aforementioned resins must contain an active hydrogen, preferably in the form of an —OH group to be most useful in the vehicles of the present invention. Many such resins are commercially available and are in common use in inks. Polyhydroxy compounds of even low molecular weight such as glycerol or diethylene glycol can provide a satisfactory ink vehicle that will dry to a hard film, if sufficient titanate ester chelate is used to effectively polymerize the mixture.

Among common solvents used in ink vehicles are xylenes, low molecular weight esters, alcohols and ketones, and petroleum distillates such as Magie oil Solvents which are graded as to boiling range, flash point and other properties. (Magie oil solvents are sold by Magie Bros. Oil Co., 9101 Fullerton Ave., Franklin Park Ill. 60131.)

Since the function of the vehicle, whether it be simple or complex, is mainly to transport the pigment it must be removed or drastically changed during the printing process. Volatile materials are simply removed by evaporation. The resinous materials are either of a hard and permanent nature themselves or they become so by a process of oxidation or polymerization on the substrate.

The vehicles of the present invention include, in addition to a resinous compound and/or a solvent, a titanium ester chelate. When the coating is deposited on a substrate and heated to about 80° C. or higher, the chelated ester becomes reactive toward active hydrogen containing groups such as hydroxyl groups, and causes cross-linking of the resin molecules through the titanium atoms. Where the resin compound contains more than one active hydrogen group, polymerization can occur with formation of large molecules. Polyhydroxy resinous compounds are preferred in the compositions of the invention.

Many representative titanium chelates are soluble in hydrocarbons, both aliphatic and aromatic, alcohols, and chlorinated products such as carbon tetrachloride. Titanium chelates can be prepared by reacting esters of ortho titanic acid such as the tetramethyl, tetraethyl, tetrapropyl, tetrabutyl, tetracyclohexyl, tetraphenyl, and tetranaphthyl (beta) esters with amino alcohols, aminophenols, aminonaphthols, glycols, organic acids, certain aldehydes, ketones, etc. Specific examples and typical procedures for preparing these compounds are given in U.S. Pat. 3,091,-625, 2,824,114, 2,643,262 and 2,870,181. The chelate compounds are most readily formed and exhibit maximum stability when the chelate linkage is included in a 5 or 6 membered ring, as is the case with the preferred compounds listed herein. One group of titanium chelates is prepared by reacting a titanium ortho ester such as tetraisopropyl or tetraisobutyl titanate with a glycol of formula

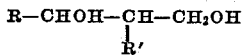

where R and R' are organic radicals that are alkyl, aryl, aralkyl, or alkaryl, using a glycol/ester ratio from ½/1 to 4/1. A preferred member of this group is tetraoctylene glycol titanate which is obtained by reacting 4 moles of 2-ethyl-1,3-hexane diol with 1 mole of tetraisopropyl titanate, giving

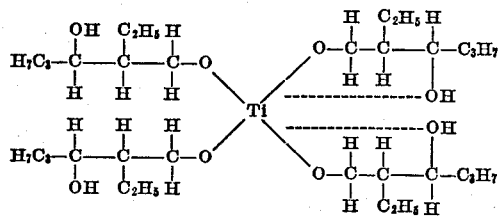

Another preferred compound is that prepared by reacting 1 mol of tetraisopropyl titanate with 2 mols of triethanolamine to give a product of mixed composition, but having as a principal component the preferred compound whose formula is

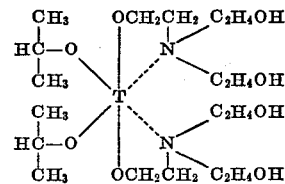

The nitrogen atoms are chelated or bonded to the titanium by secondary valence bonds.

A third preferred titanium chelate compound is titanium acetylacetonate a mixed titanate of isopropyl alcohol and enolized acetylacetone, prepared by mixing acetylacetone with tetraisopropyl titanate at below 50° C. A principal component of the resulting product is

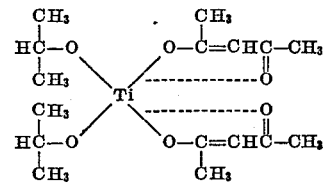

where the ketonic oxygen atoms are bonded to the titanium by secondary valences. In any case these compounds have the property of hydrolyzing only very slowly in water at room temperatures. They are soluble in isopropyl alcohol, benzene, trichloroethylene and similar solvents. The triethanolamine chelate is soluble in water and the acetyl acetonate chelate is soluble in water containing more than 50% isopropyl alcohol.

Another preferred titanium chelate is that obtained by reacting an ortho ester such as tetraisopropyl titanate with lactic acid and neutralizing with ammonia to give the compound

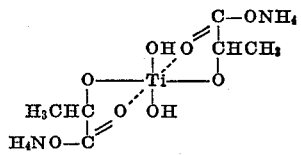

in which the carbonyl oxygen atoms are bonded to the titanium atoms by secondary valences as indicated. This titanium chelate is water soluble and hydrolyzes only very slowly; however, it is not soluble in organic solvents. Methods for preparing this and similar compounds are given in U.S. Pat. 2,870,181.

Titanium chelate compounds can be handled and shipped as 100% products or as solutions in water for water soluble chelates or in isopropyl or other alcohol for the organic soluble chelates.

Experiment has shown the applicability of the invention to most of the common types of typographic inks such as job press, automatic press, flatbed cylinder, rotary press, bond and ledger, coated paper, super calendered, parchment paper, carbon stock, corrugated container, machine finished, cellophane, and halftone inks.

Most planographic inks are amenable to improvement by inclusion of the titanium chelate compounds, including lithographic, offset, tin printing, dry offset and photogelation inks.

Titanium chelate compounds can be mixed with printing inks at room temperatures in proportions preferably from about 1% to about 50% of total ink weight. Such mixtures can be prepared well before use, as hydrolysis or other reaction of the titanium chelate compounds is very slow at ordinary temperatures. The ink can be used in the normal manner, being applied to a more or less absorbent ink roll, then transferred to the type, either metal or plastic, set in printing plates and thence to the substrate, which is then exposed for very short times of from 1/10 second up to 15 seconds or more to heat or radiant energy sufficient to raise the temperature of the ink from about 80° C. to about 400° C. which evaporates solvent present and activates the setting of the ink vehicle. The procedure is equally applicable in off-set printing where the printed matter is inked on an intermediate roll before final transfer to paper or other surface. Upon exposure to the heat or radiant energy, but not before, the titanium chelate compound exerts a multiple action on the ink setting process. Polyesterification, epoxy resin curing, etc., are accelerated. The principal reaction so far as speeding the ink setting process, however, is believed to be the cross-linking of active hydrogen containing compounds through the titanium of the ester chelate. Examples of compounds containing active hydrogens are nitrocellulose, cellulose acetate, alcohols, glycols, polyhydroxy compounds and polymers, polyamides and others. At surface temperatures above 80° C., preferably from about 100° C. to about 400° C., the cross-linking reaction is very rapid, and effective ink setting is achieved at a rate making rapid substrate travel speed possible. The printed product shows improvement in that smudging and offset are avoided, sharper outline is attained, abrasion resistance is improved, and final drying leaves an almost completely insoluble residue which does not smear, even when wet with water.

While promoting the drying of inks containing in their vehicles materials of natural origin such as rosins from various sources, the invention is equally or even more applicable to inks containing synthetic resins or other active hydrogen containing material in their vehicles. Among the resins which will react and dry more quickly with titanium chelate compounds under the influence of heat are polyamide resins, cellulosic resins, nitrocellulose resins, alkyd resins, polyester resins, rosin polyesters, maleic polyesters, fumaric polyesters, phthalic polyesters, phenolics, rosin, rosin dimers, rosin esters and polyesters, acrylics, methacrylics, melamine formaldehyde and methylol derivatives. The quality common to these various useful resin materials is the possession of active hydrogens, usually in an —OH or N—H configuration. Such compounds cross-link readily through the titanium of the ester chelate when it is activated sufficiently by heat. Presence of an active hydrogen can be detected by the Zerewitinoff reaction as described in Comprehensive Analytical Chemistry, Wilson and Wilson, Vol. IB, Elsevier Publishing Co., New York, N.Y. This reaction gives a positive test in the presence of —OH, COOH, N—H, —NH$_2$ and —SH groups in the complete absence of water. Presence of these groups can also be detected by modern spectrophotometric methods.

For resins known to contain OH groups, their concentration can be measured by determination of the acetyl value or "OH number" which is defined as "the number of milligrams of potassium hydroxide required to combine with the acetic acid liberated from 1 gram acetylated sample" (see Fritz, J. H., and Schenk, G. H., Anal. Chem. 31, 1808 (1959), for procedure). The reaction that occurs is illustrated by the following equation:

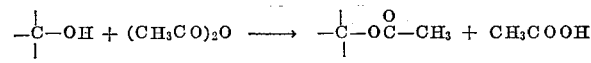

Resins having OH numbers in the range of 20 to 500 have been found useful in the ink or coating compositions of this invention.

Use of titanium chelates in printing inks avoids many of the disadvantages of prior art processes. Since the chelate compound is included in the ink it does not have to be applied in a manner that leaves it on the unprinted part of the substrate as well as on the print. Thus every bit of the chelate compound used serves its intended purpose, and none is wasted. Also there is no danger of too much or too little chelate compound being used. The proper ratio can be established and applied when the ink is prepared. No special equipment or changes in the conventional printing processes are required in realizing the advantages conferred by the inks of the invention except that the ink on the substrate must be heated sufficiently to activate the chemical action of the titanium compounds. This requires exposure to heat adequate to raise the temperature of the ink to at least 80° C. The upper temperature limit is of course limited to the combustion temperature of the substrate.

Example 1—Preparation of a titanium chelate

Two gram mols of acetyl acetone were added gradually to one gram mol of tetraisopropyl titanate in a conventional reaction flask fitted with a stirrer, thermometer, and condenser. Means were provided for cooling or heating the flask and contents. Rate of addition and cooling were adjusted to maintain temperature at about 40° C. After all the acetyl acetone had been added and reaction was finished, the product was ready to use as an ink additive. It was the compound

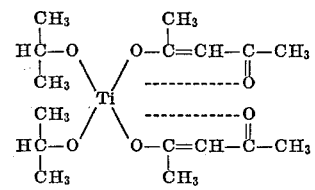

in isopropyl alcohol formed during the reaction.

Example 2.—Preparation of a titanium chelate

Two gram mols of triethanolamine were added to one gram mol of tetraisopropyl titanate gradually in a conventional reaction flask fitted with stirrer, condenser, thermometer, and means for heating or cooling. Rate of addition and cooling were adjusted to maintain temperature in the reaction mass at about 40° C. After all of the triethanolamine had been added and the reaction was finished, the product was ready to use as an ink additive. It was the compound

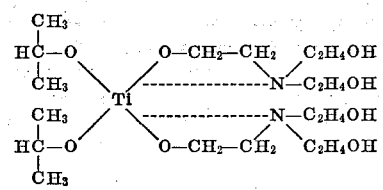

in isopropyl alcohol formed during the reaction.

Example 3—Preparation of a titanium chelate

To 285 parts of tetraisopropyl titanate dissolved in 1000 parts of acetone were added 180 parts of lactic acid dissolved in 1000 parts of acetone, and the mixture agitated thoroughly. The white precipitate formed was collected on a filter and washed three times with 500 parts of acetone, then dried in air. The dry product was soluble in water upon being neutralized with ammonia up to pH 7.5, and can be used as an ink additive. It was the compound

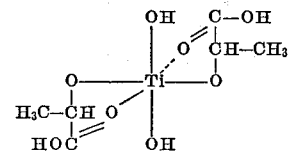

before neutralization, and

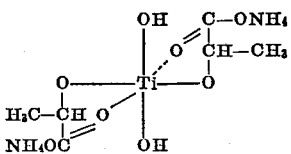

after neutralization.

Example 4

In a suitable container 584 parts by weight of 2-ethyl-1,3-hexanediol were added to 340 parts of tetraisobutyl titanate with cooling to maintain temperature below 50° C. The resulting solution of tetra-octylene glycol titanate in isobutyl alcohol can be used as an ink or coating additive.

Test method for ink drying tests (Examples 5–10).— Printing inks are composed of roughly equal weights of resin, solvent and pigment. The resin and solvent together compose the vehicle. The pigment ordinarily has no active part in the drying process and can be omitted in drying tests. Solvents usable in the tests described herein include Magie oils (high boiling aliphatic hydrocarbon solvents), toluene, xylene and others.

A solution is prepared of 1 part resin and one part solvent and to it is added about $\frac{1}{20}$ part of a titanium ester chelate usually in the form of a water or isopropyl alcohol solution. Two drops of the well mixed solution are placed on a piece of paperboard to which an aluminum foil "face" has been laminated. The aluminum surface eliminates the absorption by the substrate as a factor in the ink drying. The drops of test solution are spread out in a thin film with an area of about 15–20 inches square by rolling them back and forth on the aluminum facing with a 1½ inch diameter rubber ink test hand roller. Adjacent rollouts of samples with and without additives are made on the same support board. The board is secured to a wooden frame which is inserted vertically into a circulatory hot air laboratory oven. The air temperature is controlled at the desired temperature, 475° F. for most tests, and the surface temperatures reached on the board at various times of exposure were determined by using thermopapers (Paper Thermometer Co., Natick, Mass.). For 475° F. oven temperature surface temperatures were roughtly as follows:

| Seconds: | ° F. |
|---|---|
| 5 | 240 |
| 10 | 300 |
| 12 | 320 |
| 20 | 390 |

Five seconds represents the minimum time of exposure for reasonable accuracy and reproducibility in view of the manipulations required.

After the board is removed from the oven the adjacent films are tested by touching them with two adjacent fingers of either hand. Difference in tackiness, dryness or hardness are immediately apparent. The judgment is made within a few seconds of removal from the oven; frequently the degree of dryness noted at this time is still evident after the test films have cooled to room temperature.

The above test methods employ lower temperatures than could be used in a printing operation. The methods are designed to show drying differences under controlled laboratory conditions.

Example 5

A vehicle was prepared of 40% Pentalyn K (a rosin product obtainable from Hercules, Inc., Wilmington, Del., comprising a pentaerythritol ester of dimerized rosin acids containing free —OH groups) in Magie oil No. 535. To 10 parts of this solution was added 0.33 part of titanium acetylacetonate, a titanium chelate compound of formula

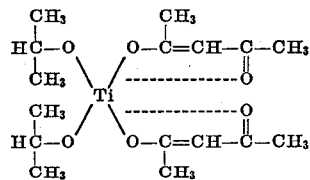

as a 75% solution in isopropanol and the resulting solution was well mixed. Two drops of the original and treated solutions were rolled out on adjacent aluminum board test panels and placed in the 475° F. oven. After 12 seconds the titanium chelate treated vehicle was completely dry while the untreated vehicle was still quite tacky. Surface temperature after 12 seconds was 320° F.

Example 6

A vehicle was prepared of 100 parts Ester Gum 8L (a commercial resin obtainable from Hercules Inc., Wilmington, Del., containing free OH groups and comprising a glycerol ester of rosin) in 100 parts Magie oil 535. A test solution (a) was prepared using 10 parts of this solution and 0.25 part of the same titanium chelate used in Ex. 5 (0.33 part of 75% solution in isopropyl alcohol). A second test solution (b) was prepared using 10 parts of the ester gum solution and 0.25 part of tetra-octylene glycol titanate, a chelated ester as prepared in Ex. 4. A sample of the Ester Gum 8L solution was also tested as a blank (c).

Two drops of each of the test vehicles were rolled out on a aluminum board test panels and placed in the 475° F. oven. Test samples (a) and (b) were both thoroughly dry after 12 seconds exposure while test sample (c) was still quite tacky at 12 seconds but dry after 15 seconds.

Example 7

Ink vehicle drying tests were performed using the following titanium chelate compounds:

(a) titanium acetylacetonate (as used in Ex. 2) used as 75% solution isopropanol
(b) tetra-octylene glycol titanate (Ex. 6 of U.S. Pat. 2,643,262) used as 100% product
(c) titanium chelate from tetraisopropyl titanate and lactic acid neutralized with ammonium hydroxide

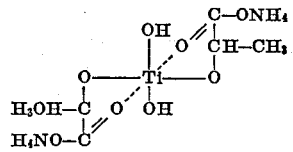

used as 50% aqueous solution
(d) titanium chelate from 1 mol of tetraisopropyl titanate and 2 mols of triethanolamine. Used as 80% solution in isopropanol.

In these tests the chelates were mixed with solutions of designated resins in diethylene glycol in the proportions (given in parts) shown in Table I below.

TABLE I

|  | 1 | 2 | 3 | 4 | 5 | 6 | 7 | 8 | 9 |
|---|---|---|---|---|---|---|---|---|---|
| Chelate: |  |  |  |  |  |  |  |  |  |
| a | .495 |  |  |  |  | .495 |  |  |  |
| b |  | .5 |  |  |  |  |  | .5 |  |
| c |  |  | 1.0 |  |  |  |  |  |  |
| d |  |  |  | .495 |  |  | .495 |  |  |
| Diethylene glycol | 10 | 10 | 10 | 10 | 10 | 10 | 10 | 10 | 10 |
| Arochem M 487 | 10 | 10 | 10 | 10 | 10 |  |  |  |  |
| Arochem M 489 |  |  |  |  |  | 10 | 10 | 10 | 10 |

Arochem M 487, a commercial resin sold by Ashland Chemical Co., Columbus, Ohio, is believed to be a glycerol phthalate polyester, and contains free OH groups.

Arochem M 489 is a commercial resin similar to the Arochem M 487.

In tests 1 to 5 the control No. 5 took 12 seconds to dry, while tests 1 to 4, all containing titanium chelates, dried in 10 seconds.

The same relation prevailed in tests 6 to 9, the control, No. 9, drying only after 12 seconds in the 475° F. oven whlie tests 6, 7, and 8 all were dry after 10 seconds.

Example 8

The following ink formulations ( given in parts) were prepared and tested by rolling out on aluminum board and drying in an oven set at 475° F.

TABLE II

|  | 1 | 2 | 3 | 4 |
|---|---|---|---|---|
| Glycerol | 50.0 | 53.0 | 22.5 | 53.0 |
| Titanium chelate of Example 1 (at a 75% solution in isopropanol) |  | 7.5 |  | 10.0 |
| Isopropyl alcohol (anhydrous) |  |  | 2.5 |  |
| Color index dye solvent Blue 38 (C.I. 74180) |  |  | 2.5 | 6.3 |

Nos. 2 and 4 dried in 10 seconds. After 12 seconds in the oven samples 1 and 3 were still not dry.

Example 9

The following formulations (given in parts) were prepared and tested as described above.

|  | 1 | 2 | 3 | 4 |
|---|---|---|---|---|
| Pentalyn K Resin (Hercules Chemical Co.) a pentaerythritol ester of dimeric resin acids—contains free OH groups | 10 | 10 | 10 | 10 |
| Magie Oil 535 | 15 | 15 | 15 | 15 |
| Titanium chelate of Example 1 (75% solution in isopropanol) |  | .495 |  | .495 |
| Color index dye pigment Blue 16 (C.I. 74100) |  |  | 2.5 | 2.5 |

Nos. 2 and 4 were dry after 12 seconds while Nos.1 and 3 were still damp and tacky.

Example 10

A vehicle was prepared of 24 g. of dipentaerythritol, 36 g. of glycerol and 53 g. of the titanium chelate prepared in Ex. 1 (75% in isopropanol solution) and also a similar preparation without the chelate. When rollouts were prepared and tested as described above, the sample containing the chelate dried after 5 seconds in the 475° F. oven, while the control was still not dry after 20 seconds in the oven.

In a similar experiment ricinoleyl alcohol and a mixture of 7 g. ricinoleyl alcohol and 10 g. of the titanium chelate solution used above were tested. The chelate containing sample dried to a hard clear film after 10 seconds in the 475° F. oven. The control did not appear to dry at all in the same time.

The preceding representative examples may be varied within the scope of the present total spcification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A method of rapidly fixing a stable vehicle for transfer of pigments to a substrate, said vehicle consisting essentially of a petroleum distillate solvent, a rosin ester of pentaerythritol or glycerol having a molecular weight of from 600 to 10,000, and from 1 to 50 percent, based on the total weight of vehicle and pigments of tetraoctylene glycol titanate or titanium acetylacetonate, said method comprising applying said vehicle to the substrate as a thin film and curing said film at surface temperatures of from about 80° C. to about 400° C. for from about .1 to about 15 seconds.

References Cited

UNITED STATES PATENTS 3,163,534    12/1964    Adams et al. _____ 101—455

FOREIGN PATENTS 759,570    8/1954    Great Britain _____ 106—22

JOAN B. EVANS, Primary Examiner

U.S. Cl. X.R.

117—132, 158; 106—14.5, 20, 27, 218, 241, 299